United States Patent [19]

Lindberg et al.

[11] 4,041,065
[45] Aug. 9, 1977

[54] POLYAMIDE-IMIDES PREPARED FROM 4-CARBOXY-PHTHALIMIDE ALIPHATIC CARBOXYLIC ACIDS

[75] Inventors: Steven E. Lindberg, Naperville; Kerford A. Marchant, Jr., Evanston, both of Ill.; Richard E. Van Strien, Griffith, Ind.

[73] Assignee: Standard Oil Company (Indiana), Chicago, Ill.

[21] Appl. No.: 543,967

[22] Filed: Jan. 24, 1975

[51] Int. Cl.$^2$ .............................................. C08G 73/14
[52] U.S. Cl. ......................... 260/47 CZ; 260/47 CP; 260/78 A; 260/78 R; 260/78 TF
[58] Field of Search .............. 260/47 CZ, 78 R, 78 A, 260/47 CP, 78 TF

[56] References Cited

U.S. PATENT DOCUMENTS 3,461,136   8/1969   Pruckmayr et al. ................. 260/326
3,567,685   3/1971   Bialous et al. .......................... 260/47

Primary Examiner—Lester L. Lee
Attorney, Agent, or Firm—Wallace L. Oliver; Arthur G. Gilkes; William T. McClain

[57] ABSTRACT

Amide-imide type polymers containing amide derivatives of 4-carboxy-phthalimide aliphatic carboxylic acids are useful as wire coatings and in film and molding applications.

10 Claims, No Drawings

POLYAMIDE-IMIDES PREPARED FROM 4-CARBOXY-PHTHALIMIDE ALIPHATIC CARBOXYLIC ACIDS

BACKGROUND OF THE INVENTION

This invention relates to amide-imide type polymers and specifically to polymers containing amide derivatives of 4-carboxy-phthalimide aliphatic carboxylic acids.

Amide-imide type polymers are used as coatings such as electrical wire insulations. Typical prior art amide-imide type resins are made in a twostep process by reactig a tricarboxylic aromatic compound and a diamine to form a polyamic acid which then must be imidized to a polyamide-imide by heat curing. There is a need for new coating materials of the amide-imide type which can be prepared and applied in a variety of techniques.

The object of our invention is to provide a new type of amide-imide polymer and more specifically to provide amide-imide polymers which are film forming and which can be used as wire coatings. Another object is to provide amide-imide polymers which can be molded into articles, which are stable in temperatures up to 400° F. Other objects appear hereafter.

SUMMARY OF THE INVENTION

Our invention is an amide-imide type polymeric composition with an inherent viscosity of 0.1 to 10.0 comprising recurrent units of:

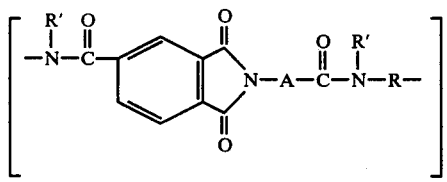

where A is a difunctional alkylene radical having from 1 to 11 carbon atoms, R is a bivalent hydrocarbon radical having from 2 to 20 carbon atoms, and R' is hydrogen or methyl.

DETAILED DESCRIPTION OF THE INVENTION

In the polymers of our invention, the difunctional alkylene radical, A, can have from about 1 to 11 carbon atoms and can include straight chain and branched species and can contain functional groups such as hydroxy, alkoxy, cyano and thio. Suitable difunctional alkylene radicals include methylene, ethylene, trimethylene, propylene, tetramethylene, pentamethylene, hexamethylene, octamethylene, decamethylene, undecamethylene, and the like. We have found polymers which contain the pentamethylene radical especially effective.

The bivalent hydrocarbon radical, R, can have from 2 to 20 carbon atoms and can be derived from diamines with normal hydrocarbon chains such as ethylene diamine, trimethylene diamine, tetramethylene diamine, pentamethylene diamine, and hexamethylene diamine, dodecyl diamine, etc.; or from branched chains such as 1,2-diaminopropane, or 4,4-dimethylheptamethylene diamine; or an aromatic diamine such as paraphenylene diamine; or from multi-ring aromatic radicals such as 4,4'-biphenylene diamine. Aromatic diamines having more than one aromatic ring may be further characterized as polycyclic aromatic compounds having two primary amino groups on an interconnected aromatic nuclei. The aromatic rings may be interconnected as fused polycyclic hydrocarbons such as napthlene or phenanthrene, or may be bridged directly to form a ring assembly such as in biphenyl or phenylnapthalene, or may be bridged indirectly such as two aromatic nucleic or fused systems joined by a stable linkage such as oxy, carbonyl, sulfonyl, sulfinyl, thio, methylene, ethylene, propylene, tetramethylene and their isomers. Suitable aromatic nuclei include phenylene, napthylene, anthracene, and the like. Representative diamines useful in our process include benzidine, 4,4'-diamino-2,2-diphenyl sulfoxide, 4,4'-diamino-diphenyl sulfide, meta-phenylenediamine, para-phenylenediamine, 1,7-diamino-4,4-dimethyl heptane, 2,11-diamino dodecane, and especially hexamethylenediamine, ethylenediamine, oxybisaniline and bis(4-aminophenyl)methane. Di-N-methyl diamines such as di-N-methyltrimethylene diamines, di-N-methylhexamethylene diamine, etc. can be used to form polymers of our invention where R' equals methyl. Since N-methyl amines are less reactive in the polymerization reaction, unsubstituted diamines are preferred.

The polymers of our invention have inherent viscosities from about 0.1 to about 10 and preferably from about 0.3 to 1.0. Relative viscosities are measured in a constant temperature bath at 30° C. at a polymer concentration of under 1% in N,N-dimethylacetamide (DMAC). Inherent viscosities are calculated using the formula on page 49 of Sorenson's and Campbell's textbook "Preparation Methods of Polymer Chemistry" (1968 ). The polyamideimides of our invention usually are soluble in strongly polar nitrogen containing solvents and based on N,N-dimethylacetamide, solutions containing up to 50 percent solids by weight are obtainable. For applications requiring use of solutions producing wire coatings, impregnating varnishes and the like, solutions of about 20 to 45 weight percent are desired. Such concentrations represent a good balance between solid contents and solution viscosity for ease of handling in most practical applications.

Infrared analysis of the polyamide-imides show characteristic absorptions at 3.0, 6.1, and 6.4 microns. Further absorptions at 5.61 and 5.78 microns indicate the cyclic imide structure.

The polymers of our invention can be prepared by either reacting the acid chloride of a 4-carboxy-phthalimide aliphatic carboxylic acid with a diamine by an interfacial condensation or by thermally polymerizing either stable hygroscopic salts or mixtures of diamines with the above-stated diacid.

In the first method, a diacid chloride with the structure:

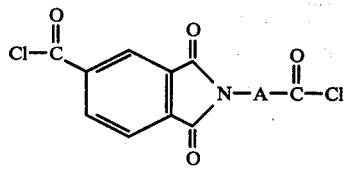

where A is a difunctional alkylene radical as specified about is dissolved in a polar solvent, such as methylene chloride, and agitated with a suitable diamine, in a dilute aqueous alkali hydroxide solution. After interfacial condensation of the dichloride and the diamine which occurs during agitation of the two immiscible solutions, the resulting polymer can be filtered and then dried. Although the reactants are preferably present in essentially an equimolar ratio, variations as high as plus or minus ten mole percent are suitable for less demanding applications, from the standpoint of high flexural requirements, than wire coating enamels. This product is a polyamide-imide having film-forming properties with an inherent viscosity of from 0.1 to about 10, and usually from 0.3 to 1.0.

In the second method, a diacid, with the structure:

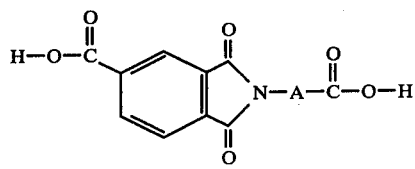

where A is a difunctional alkylene radical as specified above, is contacted with a suitable diamine and subsequently thermally polymerized. We have found that aliphatic diamines will form a hygroscopic salt in a solvent such as ethanol, which can be isolated and then polymerized by heating to about b 200° to 225° C. for about 1 to 2 hours. Continued heating at higher temperature can lead to DMAC insoluble, highly-crosslinked products.

A typical preparation of a polyamide-imide using an aliphatic diamine would include dissolving a 4-carboxyphthalimide aliphatic acid in absolute ethanol with warming. To a cooled diacid solution, a suitable aliphatic diamine is added with stirring. A mildly exothermic reaction occurs and usually after a period of several hours crystals of a diamine-diacid salt appear which can be filtered and dried. Since this salt is hygroscopic, contact with moisture should be avoided and the workup of the product is performed advantageously under a dry nitrogen atmosphere. The salt then is placed in a nitrogen-flushed polymerization tube, sealed and heated to 200° to 300° C. (preferably 200° – 225° C.) for 1 to 2 hours. After cooling the product is reheated under nitrogen to about 200° to 250° C. for 0.25 to 4 hours. During this time the temperature may be increased and/or the pressure above the mixture may be lowered down to 1 torr.

Aromatic diamines will not form a stable salt with the diacid but can be polymerized directly by heating an aromatic diamine with the above-identified diacid without solvent for 2 to 5 hours at temperature of 200° to 300° C. Temperatures above 300° C. can lead to charring of the product. Advantageously, the reactants are sealed in an oxygen-free tube and heated to about 220° C. for about 2 hours, after which time the tube is opened and reheated to 275° C. for another 2 hours.

In general, the diacids from which the diesters of our invention are prepared can be made by reacting trimellitic anyhdride and a suitable amino acid either with or without a solvent. A typical procedure is to heat a mixture of trimellitic anhydride and an amino acid to a melt temperature of about 250° to 300° C. for 5 to 30 minutes and after cooling to recrystallize the product from a suitable solvent. Alternatively, heated amino acid can be added to a trimellitic anhydride melt. Another procedure is to heat the reactants at reflux temperature in solvents such as N-methylpyrolidone or dimethylformamide for 2 to 3 hours after which time the product can be recovered and recrystallized. Dichlorides of these acids may be prepared using conventional techniques such as treatment with Vilsmeier Reagent.

The following gives the preparation of a starting material (4-carboxyphthalimide hexanoic acid): Trimellitic anhydride (960 g., 5 moles) was heated to 300° C. in a three-liter flask fitted with a nitrogen sparge, mechanical stirrer, dropping funnel and a gas-exit tube. Into this trimellitic anhydride melt, 565 grams (5 moles) of liquid ε-caprolactam heated to 200° C. was added rapidly with stirring and the resulting solution then reheated to 300° C. and maintained at that temperature for 5 minutes. Upon cooling to room temperature, the diacid product, 4-carboxy-6-phthalimide hexanoic acid, was a tan solid (1495 g., 4.9 moles, 98% yield based on the anhydride). Recrystallizations from methyl ketone, using Norite as a decolorizing agent, gave an off-white solid with a melting point of 201°-204° C.

EXAMPLE I

To a slurry of 5.00 grams (0.0164 mole) of 4-carboxyphthalimide hexanoic acid in 100 milliliters of benzene was added with stirring 2.59 milliliters (0.036 moles) of thionyl chloride in 15 milliliters of dimethylformamide over a period of 15 minutes. After an additional 20 minutes of stirring the materials was dissolved completely to form a light yellow solution. It was noted that adddition of hexane to this solution of this type did not cause precipitation of the diacid chloride. The reaction mixture was evaporated as far as possible to a viscous yellow oil which was allowed to stand in a vacuum over night to remove any volatiles.

The mixture dimethylformamide-thionyl chloride is sometimes referred to as Vilsmeier Reagent (Vilsmeier and Haack *Ber.*, 60B, 119 (1927) and *Reagents for Organic Synthesis*, L. F. Fieser and M. Fieser, John Wiley and Sons, 1967, pp. 286–289).

It was assumed that the conversion of acid to acid chloride was quantitative such that the above-preparation yielded 0.0164 of diacid chloride. This amount of the diacid chloride dissolved in 500 milliliters of methylene chloride and a 1-liter aqueous solution of hexamethylenediamine (1.90 g., 0.0164 mole) and potassium hydroxide (1.31 g., 0.033 mole) were vigorously mixed for 10 minutes in a Waring blender. The methylene chloride was removed by heating on a steam bath and finally by bubbling a nitrogen stream through the resulting warm slurry. White polymer (5.36 g.) was recovered by filtration and dried in a vacuum dessicator. An IR spectrum of the polymer revealed both amide and imide groups. The inherent viscosity of the polymer at 30° C. was 0.15 dl/g.

EXAMPLE II

Twenty-five grams (0.082 mole) of the diacid prepared above was dissolved in 500 milliliters of absolute ethanol with warming. After the solution had cooled to room temperature 9.80 grams (0.084 mole) of hexamethylene diamine was added with stirring. A mildly exothermic reaction ensued with the polymeric product crystallizing upon standing overnight. Filtration and drying with a stream of nitrogen gas gave an off-white solid (34.0 g., 0.081 mole, 98% yield) with a melting point of 182°-184° C. and a pH of 8.0 (1% aqueous solution). The elemental analysis was: Found: C,58.82; H,7.30; N,10.26; Calculated for $C_{21}H_{31}N_3O_6$: C,59.84;

H,7.41; N,9.97. The IR and NMR spectra were consistant with the intermediate salt structure.

Ten grams (0.024 mole) of this salt was placed in a glass polymerization tube which was evacuated, flushed three times with nitrogen and finally sealed at atmospheric pressure. The tube was heated at 215°±5° C. for 1.5 hours in a salt bath, cooled to room temperature and then opened. After the tube was fitted with a nitrogen sparge and a vacuum take-off, the viscous light brown liquid was heated to 250°±5° C. for 0.25 hour at atmospheric pressure and then for 0.5 hour at 1.0 torr. After the viscous melt was cooled, the glass was broken away from the resulting brown solid. A 20% solution of the polymeric solid in DMAC gave a Gardner viscosity of E and a somewhat brittle film when cast upon a glass plate.

EXAMPLE III

Ethylene diamine (2.4 g., 0.04 mole) was added with swirling to a solution of the previously described diacid (10.0 g., 0.033 mole) in 200 milliliters of absolute ethanol. The resulting milky suspension oiled out within a matter of minutes and crystallized after standing at room temperature for 72 hours. After the ethanol was decanted, the residue was dried with a stream of nitrogen while warming intermittently. The resulting very hygroscopic product (12.2 g., 0.033 mole, 98% yield) melted gradually in a sealed tube from 90° to 160° C. and had a pH of 7.2 (1% aqueous solution).

Ten grams of this salt (0.028 mole) were placed in a glass polymerization tube and after the tube was evacuated to less than 1.0 torr for 0.5 hour, a slow stream of nitrogen was passed through the powder. The tube was placed in a salt bath at 180° C. and then heated at 200° C. for 2 hours. The temperature was increased to 250° C. over a 3-hour period and finally kept at that temperature for 1 hour. The cooled dark solid (6.9 g.) was slightly soluble in DMAC.

EXAMPLE IV

Nine grams (0.029 mole) of the diacid and 6.0 g. (0.03 mole) of oxybisaniline were ground in a morter and placed in a glass polymerization tube. After the tube had been evacuated and filled with nitrogen three times, the tube was sealed at atmospheric pressure and heated to 220° C. for 2 hours. After cooling the tube was opened, fitted with a nitrogen sparge and reheated to 275° C. for 2 hours at 2.0 torr. Near the end of the heating the melt foamed up and solidified. The cooled product (13.1 g.) was a black solid which was slightly soluble in DMAC. A pliable film was formed by casting this material from a 5% solution in DMAC onto a glass plate and heating for 0.5 hour at 300° F. followed by heating at 600° F. for 3 minutes.

ILLUSTRATIVE EMBODIMENTS

For wire coating — A 15 foot General Electric Wire Coating Tower is used for this application. The tower has two ovens, a bottom stage at 500°-550° F and a cure stage at 800°-900° F. Acid cleaned and annealed 18 AWG Copper wire is used as the substrate. The wire moves continuously through the ovens at 25-45 feet/minute. Polymer as described in Example IV is applied to the wire as a 24-26% solids solution (20-30 poises) in N-methylpyrrolidone. The polymer solution is placed in a reservoir at the base of the tower. The wire is continuously coated by running through the reservoir and through a die to obtain uniform coat thickness. In order to achieve total insulation, the wire is coated six times, resulting in a 2.8 to 3.2 mil build up to polymer. The resulting coated wire is flexible without cracking the insulant.

For molded articles — For the preparation of molded specimens, a Watson-Stillman 100 Ton Hydraulic Press is used. The mold is filled with 75 to 80 grams of the polymer described in Example IV. Contact pressure is placed on the solid until a temperature of 400° F is reached. Upon reaching 400° F, the following molding cycle is utilized:

| Time (Minutes at 400° F) | Ram Pressure (Tons) |
|---|---|
| 2 | Contact |
| 2 | 2.5 |
| 2 | 5 |
| 1 | 10 |
| 10 | 25 |

The mold is cooled to 300° F at which time the article is ejected. A 1/8 inch thick by 6-inch diameter, rigid cylindrical disc is obtained by utilization of the above process.

We claim:

1. An amide-imide type polymeric composition with an inherent viscosity of 0.1 to 10.0 consisting essentially of recurrent units of:

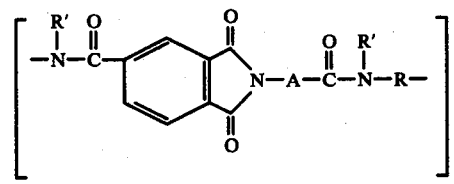

where A is a difunctional alkylene radical having from 1 to 11 carbon atoms, R is a bivalent hydrocarbon radical having from 2 to 20 carbon atoms, and R' is either hydrogen or methyl.

2. The composition of claim 1 where A is the pentamethylene radical.

3. The composition of claim 1 where R is the hexamethylene radical.

4. The composition of claim 3 where A is the pentamethylene radical.

5. The composition of claim 1 where R is the ethylene radical.

6. The composition of claim 5 where A is the pentamethylene radical.

7. The composition of claim 1 where R is the

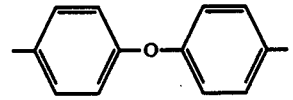

radical.

8. The composition of claim 7 where A is the pentamethylene radical.

9. The composition of claim 1 where R is the

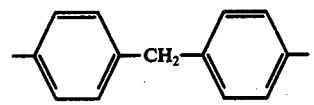

radical.

10. The composition of claim 9 where R is the pentamethylene radical.